(12) United States Patent
Carter et al.

(10) Patent No.: US 10,581,340 B2
(45) Date of Patent: Mar. 3, 2020

(54) SOLAR DRIVE SYSTEM AND METHOD FOR TRACKING THE MAXIMUM POWER POINT OF A PHOTOVOLTAIC ARRAY

(71) Applicant: Siemens Aktiengesellschaft, Munich (DE)

(72) Inventors: Robert Carter, Knutsford (GB); William John Quinn, Macclesfield (GB)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/744,118

(22) PCT Filed: Aug. 1, 2016

(86) PCT No.: PCT/EP2016/068348
§ 371 (c)(1),
(2) Date: Jan. 12, 2018

(87) PCT Pub. No.: WO2017/021379
PCT Pub. Date: Feb. 9, 2017

(65) Prior Publication Data
US 2018/0203478 A1 Jul. 19, 2018

(30) Foreign Application Priority Data
Jul. 31, 2015 (GB) .................................. 1513549.4

(51) Int. Cl.
*H02M 7/48* (2007.01)
*G05F 1/67* (2006.01)
(Continued)

(52) U.S. Cl.
CPC .............. *H02M 7/48* (2013.01); *F03G 6/001* (2013.01); *G05F 1/67* (2013.01); *H02P 27/06* (2013.01); *Y02E 10/46* (2013.01); *Y02E 10/58* (2013.01)

(58) Field of Classification Search
CPC .. H02M 7/48; G05F 1/67; F03G 6/001; H02P 27/06
See application file for complete search history.

(56) References Cited

U.S. PATENT DOCUMENTS 4,375,662 A * 3/1983 Baker ....................... G05F 1/67
136/293
4,721,861 A * 1/1988 Saito ...................... G05D 17/02
290/4 C
(Continued)

FOREIGN PATENT DOCUMENTS

CN 102619762 A 8/2012
CN 203352474 U 12/2013
(Continued)

OTHER PUBLICATIONS

GB Search Report dated Jan. 25, 2017, for GB1513549.4.
International Search Report dated Oct. 27, 2016, for PCT/EP2016/068348.

*Primary Examiner* — Yusef A Ahmed
(74) *Attorney, Agent, or Firm* — Beusse Wolter Sanks & Maire

(57) ABSTRACT

A solar drive system, having: at least one photovoltaic array generating a DC current; at least one inverter electrically connected to the photovoltaic array for inverting the DC current into an AC current; at least one electric motor electrically connected to the inverter for supplying the electric motor with the AC current; and at least one device for determining a present rotational frequency of the electric motor; wherein the inverter is configured to track a maxi-
(Continued)

mum power point of the photovoltaic array by performing a Perturb and Observe Maximum Power Point Tracking method and to determine a step direction of the Perturb and Observe Maximum Power Point Tracking method using the determined present rotational frequency of the electric motor.

6 Claims, 2 Drawing Sheets

(51) Int. Cl.
*F03G 6/00* (2006.01)
*H02P 27/06* (2006.01)

(56) References Cited

U.S. PATENT DOCUMENTS

| | | | | |
|---|---|---|---|---|
| 4,825,131 | A * | 4/1989 | Nozaki | B60L 9/22 180/197 |
| 5,012,169 | A * | 4/1991 | Ono | B25J 9/126 318/568.2 |
| 5,194,794 | A * | 3/1993 | Shamoto | B62D 5/046 180/446 |
| 5,950,752 | A * | 9/1999 | Lyons | B60H 1/004 180/65.22 |
| 6,102,176 | A * | 8/2000 | Fujikawa | F16H 61/12 192/3.58 |
| 6,417,643 | B1 * | 7/2002 | Shiba | B41F 13/0045 318/34 |
| 6,653,745 | B1 * | 11/2003 | Masaki | H02J 7/1423 307/10.1 |
| 8,054,084 | B2 * | 11/2011 | Schulz | G01R 31/346 324/545 |
| 8,922,185 | B2 | 12/2014 | Ehlmann et al. | |
| 9,207,700 | B2 * | 12/2015 | Kohno | G05F 1/67 |
| 9,673,729 | B2 * | 6/2017 | Perreault | G05F 1/571 |
| 9,673,732 | B2 * | 6/2017 | Deboy | H02M 7/49 |
| 9,680,304 | B2 * | 6/2017 | Adest | H02J 3/383 |
| 9,853,490 | B2 * | 12/2017 | Adest | H02J 7/0052 |
| 9,856,857 | B2 * | 1/2018 | Vitale | F03D 7/046 |
| 9,948,233 | B2 * | 4/2018 | Adest | H02S 40/34 |
| 9,960,667 | B2 * | 5/2018 | Adest | H02M 1/36 |
| 2003/0020342 | A1 * | 1/2003 | Takeuchi | B60L 15/2036 310/68 B |
| 2003/0174450 | A1 * | 9/2003 | Nakajima | F04B 17/006 361/31 |
| 2004/0032230 | A1 * | 2/2004 | Schwarz | H02P 6/18 318/400.01 |
| 2005/0002214 | A1 * | 1/2005 | Deng | G05F 1/67 363/131 |
| 2005/0116671 | A1 * | 6/2005 | Minami | G05F 1/67 318/275 |
| 2005/0174088 | A1 * | 8/2005 | Tanimoto | H02P 21/06 318/807 |
| 2006/0038530 | A1 * | 2/2006 | Holling | H02P 23/14 318/807 |
| 2006/0071629 | A1 * | 4/2006 | Holling | H02P 23/0004 318/807 |
| 2006/0082339 | A1 * | 4/2006 | Hamaoka | F04B 35/04 318/400.21 |
| 2006/0267534 | A1 * | 11/2006 | Lendi | G05B 19/231 318/466 |
| 2006/0279238 | A1 * | 12/2006 | Lendi | F24D 19/1018 318/139 |
| 2007/0290651 | A1 | 12/2007 | McNulty et al. | |
| 2010/0161187 | A1 * | 6/2010 | Ito | F16H 61/12 701/58 |
| 2010/0185350 | A1 * | 7/2010 | Okamura | B60L 15/025 701/22 |
| 2010/0207455 | A1 * | 8/2010 | Erickson, Jr. | G05F 1/67 307/82 |
| 2010/0236612 | A1 * | 9/2010 | Khajehoddin | G05F 1/67 136/252 |
| 2010/0265747 | A1 * | 10/2010 | Egiziano | G05F 1/67 363/132 |
| 2010/0283325 | A1 * | 11/2010 | Marcianesi | G05F 1/67 307/82 |
| 2010/0302819 | A1 * | 12/2010 | O'Brien | G05F 1/67 363/95 |
| 2011/0064496 | A1 * | 3/2011 | Ashikawa | G03G 15/657 399/361 |
| 2011/0080125 | A1 * | 4/2011 | Shimada | H02P 5/74 318/400.09 |
| 2011/0153234 | A1 * | 6/2011 | Winterhalter | H02H 3/332 702/58 |
| 2012/0069602 | A1 * | 3/2012 | Escobar | G05F 1/67 363/13 |
| 2012/0075898 | A1 * | 3/2012 | Sigamani | G05F 1/67 363/131 |
| 2012/0187680 | A1 * | 7/2012 | Spooner | H02J 3/36 290/43 |
| 2012/0205974 | A1 * | 8/2012 | McCaslin | H02J 3/385 307/18 |
| 2012/0226397 | A1 * | 9/2012 | Sopko | B60L 3/003 701/22 |
| 2013/0033205 | A1 * | 2/2013 | Furukawa | H02P 21/0003 318/400.02 |
| 2013/0057051 | A1 * | 3/2013 | Matsuura | B60L 7/18 303/3 |
| 2013/0077366 | A1 * | 3/2013 | Kim | H01L 31/02021 363/95 |
| 2013/0187473 | A1 * | 7/2013 | Deboy | H02M 7/49 307/82 |
| 2013/0221753 | A1 * | 8/2013 | Perreault | G05F 1/571 307/77 |
| 2013/0221885 | A1 * | 8/2013 | Hunter | H02P 21/0003 318/400.15 |
| 2014/0268943 | A1 * | 9/2014 | Phadke | H02H 7/1222 363/55 |
| 2014/0354203 | A1 * | 12/2014 | Vanko | B24B 23/00 318/465 |
| 2015/0069840 | A1 * | 3/2015 | Teo | G05F 1/67 307/52 |
| 2015/0337521 | A1 * | 11/2015 | Sakamoto | B60K 6/485 180/65.26 |
| 2015/0370278 | A1 * | 12/2015 | Li | G05F 1/67 323/234 |
| 2016/0036450 | A1 * | 2/2016 | McCall | F04B 17/03 700/287 |
| 2016/0076518 | A1 * | 3/2016 | Vitale | F03D 7/0276 290/44 |
| 2016/0107627 | A1 * | 4/2016 | Lutz | B60T 8/368 303/20 |
| 2016/0178021 | A1 * | 6/2016 | Masuda | H02K 7/06 188/162 |
| 2016/0226424 | A1 * | 8/2016 | Li | H02J 3/383 |
| 2016/0248347 | A1 * | 8/2016 | Shinohara | H02P 3/12 |
| 2016/0359433 | A1 * | 12/2016 | Schult | H02J 3/01 |
| 2017/0096327 | A1 * | 4/2017 | Schuster | H02S 10/10 |
| 2017/0126011 | A1 * | 5/2017 | Jussila | H02J 3/385 |
| 2017/0207741 | A1 * | 7/2017 | Kim | H02J 3/385 |
| 2017/0237376 | A1 * | 8/2017 | Saeki | H02P 27/047 318/799 |
| 2018/0289229 | A1 * | 10/2018 | Kim | A47L 9/28 |

FOREIGN PATENT DOCUMENTS

| | | |
|---|---|---|
| JP | S6345616 A | 2/1988 |
| JP | H0895655 A | 4/1996 |
| JP | H08338391 A | 12/1996 |
| JP | 2003195957 A | 7/2003 |

* cited by examiner

SOLAR DRIVE SYSTEM AND METHOD FOR TRACKING THE MAXIMUM POWER POINT OF A PHOTOVOLTAIC ARRAY

CROSS REFERENCE TO RELATED APPLICATIONS

This application is the US National Stage of International Application No. PCT/EP2016/068348 filed 1 Aug. 2016, and claims the benefit thereof. The International Application claims the benefit of Application No. GB 1513549.4 filed 31 Jul. 2015. All of the applications are incorporated by reference herein in their entirety.

FIELD OF INVENTION

The invention relates to a solar drive system and a method for tracking the maximum power point of a photovoltaic array driving an electric motor.

BACKGROUND OF INVENTION

In remote areas and areas with no or unreliable mains a photovoltaic array may be utilized for driving a load, such as an electric motor of a water pump or a ventilator.

An optimal operating point of a photovoltaic array is not constant but depends on the solar irradiation intensity, the temperature of the photovoltaic array, and the type of the photovoltaic cells employed in the photovoltaic array. Therefore, a photovoltaic array is frequently controlled to operate at the maximum power point of its I/V characteristic, thus gaining maximum benefit from array investment.

A conventional photovoltaic array output power measurement using controller analogue-digital-converters (ADC) has relatively poor accuracy. In particular, the output power measurement is subjected to inaccuracies and to both integral and differential non-linearities associated with ADCs and subsequent integer arithmetic. This may result in less than optimum performance or in settling at a spurious power peak away from and smaller than the real maximum power peak of the photovoltaic array.

It is known to use Maximum Power Point Tracking (MPPT) with photovoltaic arrays to maximize the power extraction from a photovoltaic array. The central problem addressed by MPPT is that the efficiency of power transfer from a photovoltaic array depends amongst others on the electrical characteristics of the load driven by the photovoltaic array. When, for example, the solar irradiation intensity varies, the load characteristic that gives the highest power transfer efficiency changes, so that the efficiency of the solar drive system is optimized when the load characteristic changes to keep the power transfer at highest efficiency. This load characteristic is called the maximum power point and MPPT is the process of finding this point and keeping the load characteristic there. MPPT solves the problem of choosing the best load to be presented to the photovoltaic array in order to get the most usable power out. It is the purpose of MPPT to sample the output of the photovoltaic array and apply a proper resistance (load) to obtain maximum power for any given environmental conditions.

MPPT devices are typically integrated into an electric power converter system that provides voltage or current conversion, filtering, and regulation for driving various loads, such as electric motors. Solar inverters convert the DC power to AC power and may incorporate MPPT. Such inverters sample the output power (I-V curve) from the photovoltaic array and apply the proper resistance (load) so as to obtain maximum power. Maximum power point trackers may implement different algorithms and switch between them based on the operating conditions of the photovoltaic array.

A special MPPT method is the Perturb and Observe (P&O) MPPT method. In this method a controller adjusts the load by adjusting the voltage of the photovoltaic array by a small amount in a step direction and measures the output power of the photovoltaic array. If the power increases, further adjustments in that step direction are tried until power no longer increases. If the power decreases, the step direction is changed.

SUMMARY OF INVENTION

It is an object of the invention to track the maximum power point of a photovoltaic array of a solar drive system with more accuracy.

This object is solved by the independent claims. Advantageous embodiments are disclosed in the following description, the dependent claims and in the figures, wherein these embodiments either by taken alone or in any combination with each other may relate to an advantageous or preferred aspect of the invention.

A solar drive system according to the invention comprises: —at least one photovoltaic array generating a DC current; —at least one inverter electrically connected to the photovoltaic array for inverting the DC current into an AC current; —at least one electric motor electrically connected to the inverter for supplying the electric motor with the AC current; and —at least one device for determining a present rotational frequency of the electric motor; wherein —the inverter is configured to track a maximum power point of the photovoltaic array by performing a Perturb and Observe Maximum Power Point Tracking method and to determine a step direction of the Perturb and Observe Maximum Power Point Tracking method using the determined present rotational frequency of the electric motor.

According to the invention the present rotational frequency of the electric motor is used for determining the step direction of the Perturb and Observe Maximum Power Point Tracking (P&O MPPT) method. If a perturbation (load, voltage) is made in a first step direction and if the present rotational frequency of the electric motor increases, what can be determined from a comparison of two successively determined present rotational frequencies, the next perturbation step is made in the first step direction. If the present rotational frequency of the electric motor decreases in the first step direction, the step direction is changed and the next step is made in a second step direction.

The invention is based on the insight that for a P&O MPPT the actual absolute power level is not so important. Instead, the important factor is to determine whether the power level is increasing or decreasing. Hence, the power measurement linearity is less important than its monotonicity.

The present rotational frequency of the electric motor can be simply determined and is known from such a determination with complete accuracy. When the output power of the photovoltaic array is known to be a monotonic function of the rotational frequency of the electric motor, which it typically is, this factor (i.e. the rotational frequency of the electric motor) can be used in the P&O MPPT stepping algorithm instead of electrical power derived from current and voltage measurements, resulting in a significant improvement to the P&O MPPT performance and reliability.

Thus, the maximum power point of a photovoltaic array of a solar drive system can be tracked with more accuracy.

The solar drive system according to the invention may also comprise two or more photovoltaic arrays commonly driving a single electric motor or each driving a separate electric motor. In the first case, the solar drive system comprises a single inverter. In the second case, the solar drive system comprises a separate inverter for each electric motor. The photovoltaic array may be a solar photovoltaic array using the photoelectric effect or a thermophotovoltaic array. The photovoltaic array generates a direct current (DC) current and a DC voltage.

For controlling the voltage of the photovoltaic array the inverter may comprise a proportional-integral-derivative (PID) control loop. The inverter generates an alternating current (AC) current and an AC voltage with one, two, three or more phases.

The electric motor may be a pump motor of a pump for pumping a liquid, especially water, or another drive motor, for example, of a ventilation and/or climatisation device. The electric motor may be a three-phase motor.

Advantageously, the inverter is configured to determine the present rotational frequency of the electric motor from the frequency of the AC current of the inverter. Thus, no additional sensor device is required for determining the present rotational frequency of the electric motor. The rotational frequency of the electric motor increases with the frequency of the AC current of the inverter, and vice versa. There is a unique assignment between the rotational frequency of the electric motor and the frequency of the AC current of the inverter. The frequency setpoint of the inverter itself may be used for the electric motor rotational frequency detection.

Advantageously, the solar drive system further comprises at least one device for determining the present rotational frequency of the electric motor and being arranged on the electric motor and electrically connected to the inverter. With this device, the present rotational frequency of the electric motor can be directly measured. In order to transmit corresponding measurement signals to the inverter, the device is electrically connected to the inverter. The device may be any kind of sensor or a determination algorithm having an input different from the present rotational frequency of the electric motor but being able to accurately determine the present rotational frequency from said input.

The device advantageously comprises at least one sensor element for detecting the present rotational frequency of the electric motor and being arranged on the electric motor, the sensor element being connected to the inverter by wire or wireless. The sensor element may be a rotary encoder or the like.

Advantageously the device is a component of a motor electronic of the electric motor, the motor electronic being connected to the inverter by wire or wireless. Thus, no additional sensor element or the like is necessary.

A method for tracking the maximum power point of a photovoltaic array driving an electric motor according to the invention comprises: —determining a present rotational frequency of the electric motor; —performing a Perturb and Observe Maximum Power Point Tracking method; and —determining a step direction of the Perturb and Observe Maximum Power Point Tracking method using the determined present rotational frequency of the electric motor.

Advantages mentioned above with respect to the solar drive system are correspondingly connected with this method. In particular, the solar drive system may be used to perform the method.

Advantageously, the present rotational frequency of the electric motor is determined from the frequency of an AC current supplied from an inverter to the electric motor. This can be done by the inverter itself or by a separate unit.

Advantageously, the present rotational frequency of the electric motor is directly measured. This may be done with the device described above.

BRIEF DESCRIPTION OF THE DRAWINGS

The above mentioned attributes and other features and advantages of the invention and the manner of attaining them will become more apparent and the invention itself will be better understood by reference to the following description of embodiments of the invention taken in conjunction with the accompanying drawings, wherein.

DETAILED DESCRIPTION OF EMBODIMENTS

Figure 1:
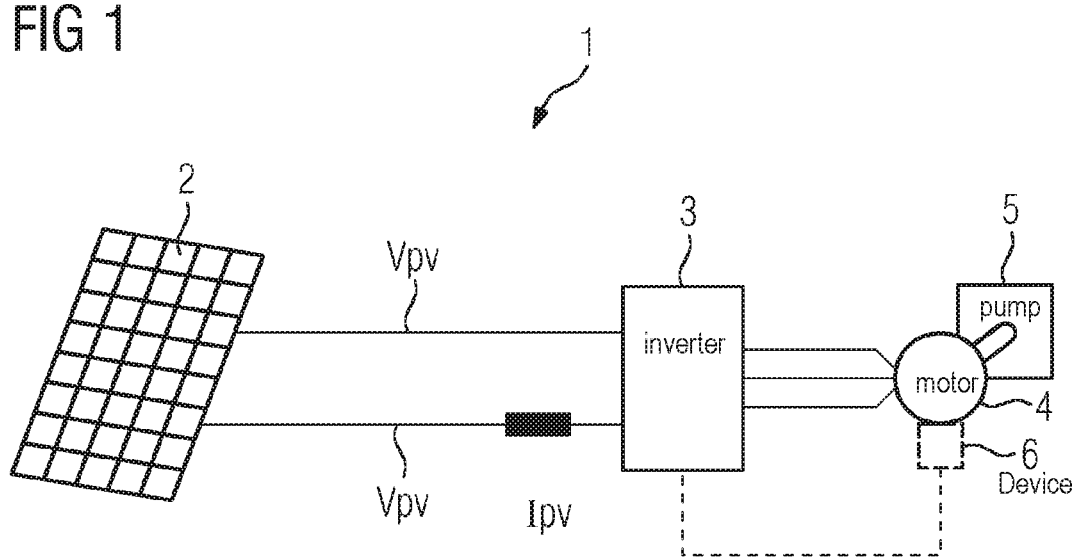
FIG. 1 shows a solar drive system according to an embodiment of the invention.

FIG. 1 shows a solar drive system 1 according to an embodiment of the invention.

The solar drive system 1 comprises a photovoltaic array 2 generating a DC current Ipv and a DC voltage Vpv. The solar drive system 1 further comprises an inverter 3 electrically connected to the photovoltaic array 2 for inverting the DC current Ipv into an AC current, and die DC voltage Vpv into an AC voltage. In addition, the solar drive system 1 comprises an electric motor 4 electrically connected to the inverter 3 for supplying the electric motor 4 with the AC current. The electric motor 4 is a pump motor of a pump 5 for pumping a liquid, especially water.

The inverter 3 is configured to track a maximum power point of the photovoltaic array 2 by performing a Perturb and Observe Maximum Power Point Tracking method and to determine a step direction of the Perturb and Observe Maximum Power Point Tracking method using the present rotational frequency of the electric motor 4. For this, the inverter 3 is further configured to determine the present rotational frequency of the electric motor 4 from the frequency of the AC current of the inverter 3.

Alternatively, the solar drive system 1 may comprise a device 6 for determining a present rotational frequency of the electric motor 4. The device 6 may be electrically connected to the inverter 3 to supply the determined present rotational frequency to the inverter 3. In most cases the rotational frequency of the electric motor 4 will be assumed to be the inverter 3 AC output frequency, but the external device 6 could alternatively be used.

The device may comprise at least one sensor element (not shown) for detecting the present rotational frequency of the electric motor 4 and being arranged on the electric motor 4, the sensor element being connected to the inverter 3 by wire or wireless. Alternatively, the device 6 may be a component of a motor electronic (not shown) of the electric motor 4, the motor electronic being connected to the inverter 3 by wire or wireless.

Figure 2:
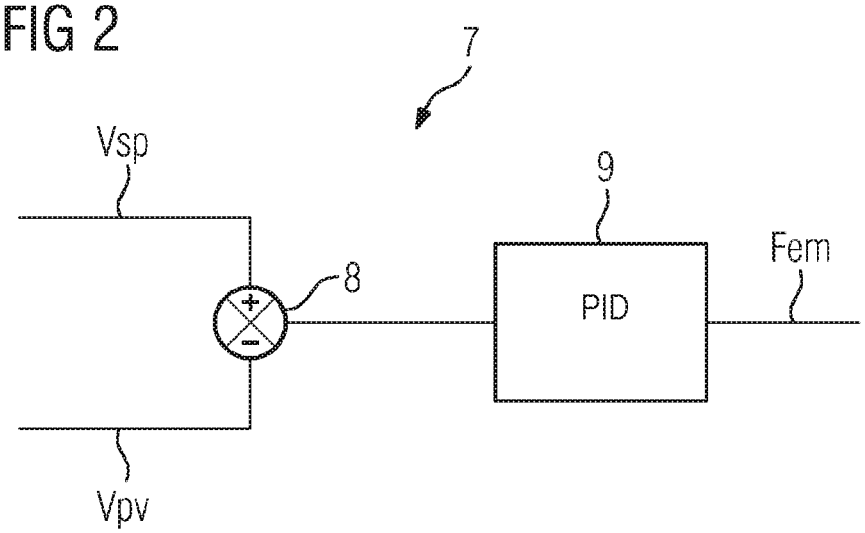
FIG. 2 shows a voltage controller of a solar drive system according to a further embodiment of the invention.

FIG. 2 shows a voltage controller 7 of a solar drive system (not shown) according to a further embodiment of the invention.

The voltage controller 7 comprises a differentiator 8 for determining the difference Ve between a setpoint voltage Vsp and the present voltage Vpv generated by the photovoltaic array (not shown). The difference voltage Ve is supplied to a PID 9 of the voltage controller 7. PID 9 generates a control signal Fem supplied to the electric motor (not shown). With the control signal Fem the rotational frequency of the electric motor is adjusted to achieve a requested array voltage setpoint. So, for example, if the voltage Vpv increases above Vsp, the voltage controller 7 will suitably increase the rotational frequency of the electric motor to bring the voltage Vpv back down again. For this, the electric motor power consumption needs to be a monotonic function of rotational frequency of the electric motor.

Figure 3:
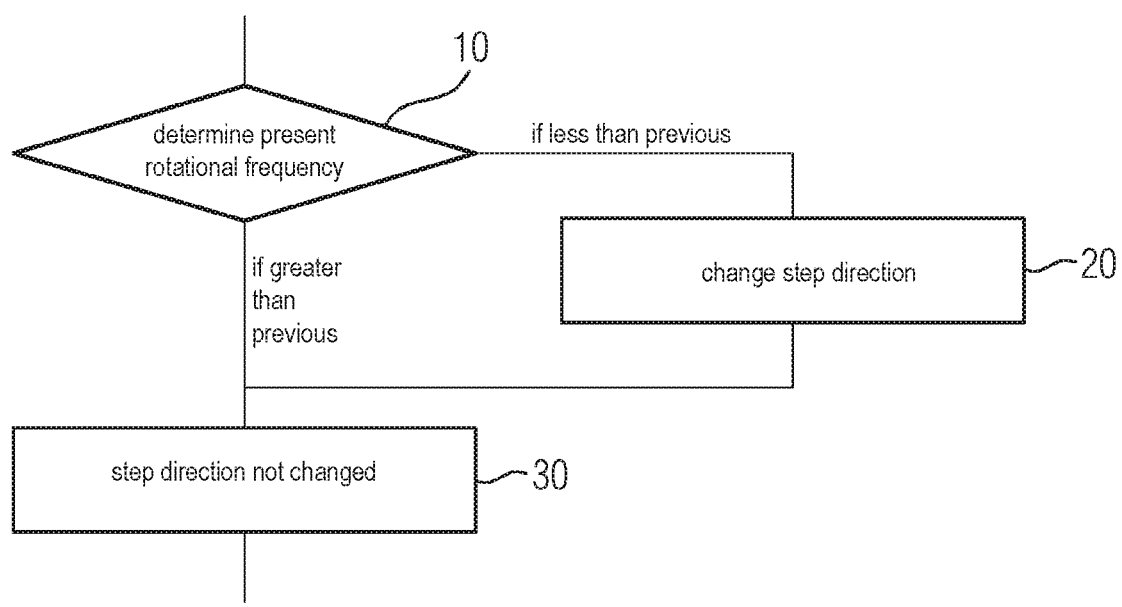
FIG. 3 shows a method for tracking the maximum power point of a photovoltaic array driving an electric motor according to a further embodiment of the invention.

FIG. 3 shows a method for tracking the maximum power point of a photovoltaic array driving an electric motor according to a further embodiment of the invention.

A present rotational frequency of the electric motor is determined continuously or in time intervals and a Perturb and Observe Maximum Power Point Tracking method is performed.

In method step 10 a perturbation step by varying a load/voltage is made and the present rotational frequency of the electric motor is determined after this perturbation. Then, the determined present rotational frequency is compared with the previously determined present rotational frequency of the electric motor. If the determined present rotational frequency is less than the previously determined present rotational frequency, the step direction is changed in method step 20. If the determined present rotational frequency is greater than the previously determined present rotational frequency, the step direction is not changed and the next perturbation step is made in method step 30 in the last step direction. These method steps are repeated until the determined present rotational frequency equals the previously determined present rotational frequency. Then the present voltage of the photovoltaic array has reached the setpoint voltage. Thus, it is determined a step direction of the Perturb and Observe Maximum Power Point Tracking method using the determined present rotational frequency of the electric motor.

Although the invention has been explained and described in detail in connection with the preferred embodiments it is noted that the invention is not limited to the disclosed embodiments. A person skilled in the art can derive from these embodiments other variations without leaving the scope of protection of the invention.

The invention claimed is:

1. A solar drive system, comprising:
   at least one photovoltaic array generating a DC current;
   at least one inverter electrically connected to the at least one photovoltaic array for inverting the DC current into an AC current; and
   at least one electric motor electrically connected to the at least one inverter which supplies the at least one electric motor with the AC current;
   at least one sensor element for detecting a present rotational frequency of the at least one electric motor, the at least one sensor element being arranged on the at least one electric motor and being connected to the at least one inverter by wire or wireless;
   wherein the at least one inverter is configured to track a maximum power point of the at least one photovoltaic array by performing a Perturb and Observe Maximum Power Point Tracking method and to determine a step direction of the Perturb and Observe Maximum Power Point Tracking method using the present rotational frequency of the at least one electric motor.

2. A solar drive system, comprising:
   at least one photovoltaic array generating a DC current;
   at least one inverter electrically connected to the at least one photovoltaic array for inverting the DC current into an AC current; and
   at least one electric motor electrically connected to the at least one inverter which supplies the at least one electric motor with the AC current;
   wherein the at least one inverter is configured to detect a present rotational frequency of the at least one electric motor from a frequency of the AC current of the at least one inverter using a frequency setpoint of the at least one inverter to detect the present rotational frequency from the frequency of the AC current supplied from the at least one inverter to the at least one electric motor;
   wherein the at least one inverter is configured to track a maximum power point of the at least one photovoltaic array by performing a Perturb and Observe Maximum Power Point Tracking method and to determine a step direction of the Perturb and Observe Maximum Power Point Tracking method using the present rotational frequency of the at least one electric motor.

3. A method for tracking a maximum power point of a photovoltaic array driving an electric motor through an inverter, comprising:
   detecting a present rotational frequency of the electric motor; wherein detecting the present rotational frequency of the electric motor comprises direct measurement by a sensor;
   performing a Perturb and Observe Maximum Power Point Tracking method to track the maximum power point of the photovoltaic array; and
   determining a step direction of the Perturb and Observe Maximum Power Point Tracking method using the present rotational frequency of the electric motor.

4. The method according to claim 3, further comprising:
   generating a DC current by the photovoltaic array;
   inverting the DC current into an AC current by the inverter; and
   supplying the electric motor with the AC current.

5. A method for tracking a maximum power point of a photovoltaic array driving an electric motor through an inverter, comprising:
   detecting a present rotational frequency of the electric motor from a frequency of an AC current supplied from the inverter to the electric motor using a frequency setpoint of the inverter to detect the present rotational frequency from the frequency of the AC current supplied from the inverter to the electric motor;
   performing a Perturb and Observe Maximum Power Point Tracking method to track the maximum power point of the photovoltaic array; and
   determining a step direction of the Perturb and Observe Maximum Power Point Tracking method using the present rotational frequency of the electric motor.

6. The method according to claim 5, further comprising:
   generating a DC current by the photovoltaic array;
   inverting the DC current into the AC current by the inverter; and
   supplying the electric motor with the AC current.

* * * * *